(12) United States Patent
Dirand et al.

(10) Patent No.: US 11,000,144 B2
(45) Date of Patent: May 11, 2021

(54) ELECTRIC COOKING APPLIANCE COMPRISING A DRAIN SUPPORT WITH LID

(71) Applicant: SEB S.A., Ecully (FR)

(72) Inventors: Pascal Dirand, Marsannay la Cote (FR); Pierre Sartout, Dijon (FR); Frédéric Seurat, Bretigny (FR)

(73) Assignee: SEB S.A.

( * ) Notice: Subject to any disclaimer, the term of this patent is extended or adjusted under 35 U.S.C. 154(b) by 0 days.

(21) Appl. No.: 16/756,412

(22) PCT Filed: Oct. 12, 2018

(86) PCT No.: PCT/FR2018/052545
§ 371 (c)(1),
(2) Date: Apr. 15, 2020

(87) PCT Pub. No.: WO2019/077242
PCT Pub. Date: Apr. 25, 2019

(65) Prior Publication Data
US 2020/0315388 A1     Oct. 8, 2020

(30) Foreign Application Priority Data

Oct. 16, 2017  (FR) ...................................... 1759688

(51) Int. Cl.
*A47J 27/00*     (2006.01)
*A47J 37/12*     (2006.01)
(Continued)

(52) U.S. Cl.
CPC ............. *A47J 27/004* (2013.01); *A47J 27/21* (2013.01); *A47J 36/06* (2013.01); *A47J 36/08* (2013.01);
(Continued)

(58) Field of Classification Search
CPC .... A47J 27/004; A47J 27/21; A47J 2027/006; A47J 36/08; A47J 36/34; A47J 37/1285
(Continued)

(56) References Cited

U.S. PATENT DOCUMENTS 6,327,965 B1 * 12/2001 Lin Tien .................. A47J 31/02
99/299
2003/0070557 A1 * 4/2003 Bizard ................ A47J 37/1285
99/330

(Continued)

FOREIGN PATENT DOCUMENTS

| EP | 1504705 A1 | 2/2005 |
| EP | 2103240 A1 | 9/2009 |

OTHER PUBLICATIONS

International Search Report for Application No. PCT/FR2018/052545 dated Jan. 22, 2019, 2 pages.

*Primary Examiner* — Reginald Alexander
(74) *Attorney, Agent, or Firm* — Lerner, David, Littenberg, Krumholz & Mentlik, LLP

(57) ABSTRACT

A electrical cooking appliance, in particular an electric fryer, comprising a cooking assembly, a draining support forming a draining receptacle, and a lid configured to be mounted mounted on the draining support, the electrical cooking appliance configured to assume a drain configuration in which the draining support supports the cooking assembly, the cooking assembly comprising a vessel configured for receiving a cooking bath, the vessel provided with a draining device comprising a valve configured to adopt a closed stable return position and an open position, a control member configured to move the valve into the open position when the electrical cooking appliance assumes the draining configuration. When the electrical cooking appliance adopts the draining configuration, the lid is mounted on the draining support supporting the cooking assembly, the lid is config- (Continued)

ured to provide a passage for the cooking bath to flow into the draining receptacle from the draining device.

18 Claims, 4 Drawing Sheets

(51) Int. Cl.
*A47J 36/06* (2006.01)
*A47J 36/08* (2006.01)
*A47J 27/21* (2006.01)

(52) U.S. Cl.
CPC ........ *A47J 37/1209* (2013.01); *A47J 37/1261* (2013.01); *A47J 37/1285* (2013.01); *A47J 2027/006* (2013.01)

(58) Field of Classification Search
USPC .......................................... 99/299, 411, 423
See application file for complete search history.

(56) References Cited

U.S. PATENT DOCUMENTS

| | | | | |
|---|---|---|---|---|
| 2012/0251695 | A1* | 10/2012 | Neff | A47J 27/004 426/509 |
| 2017/0127871 | A1* | 5/2017 | Leung | A47J 27/04 |
| 2020/0000262 | A1* | 1/2020 | Delrue | F22B 1/284 |

* cited by examiner

ELECTRIC COOKING APPLIANCE COMPRISING A DRAIN SUPPORT WITH LID

CROSS-REFERENCE TO RELATED APPLICATIONS

The present application is a national phase entry under 35 U.S.C. § 371 of International Application No. PCT/FR2018/052545 filed Oct. 12, 2018, which claims priority from French Application No. 1759688 filed Oct. 16, 2017, all of which are hereby incorporated herein by reference.

The present invention relates to the technical field of electric cooking appliances comprising a tank capable of receiving a cooking bath.

The present invention relates more particularly to electric cooking appliances comprising a cooking set which can be arranged on a drain support.

The present invention relates in particular, but not exclusively, to fryers.

BACKGROUND OF THE INVENTION

Document EP1504705 describes an electric cooking appliance comprising a cooking set consisting of a tank capable of receiving a cooking bath, this cooking set possibly being arranged on a drain support forming a drain receptacle. The tank is provided with a drainage device comprising a valve capable of occupying a closed stable recall position and an open position. The drain support comprises a control part designed to bring the valve into the open position when the drain support carries the cooking set. Thus, the installation of the cooking set on the drain support allows to place the valve in the open position. The cooking bath can thus be transferred from the tank to the drain support via the drain device. The appliance has a cover, which can be mounted on the drain support to close the drain receptacle.

A disadvantage of the aforementioned embodiment lies in the fact that the cover must be removed from the drain support before being able to transfer the cooking bath from the tank to the drain receptacle via the drain device. When the cooking bath is emptied, splashes may occur, and these splashes may possibly reach the lower part of the cooking set disposed on the drain support.

SUMMARY OF THE INVENTION

An aspect of the present invention may provide an electric cooking appliance, the tank of which has a drainage device activated by the positioning of the tank on a drainage support, the use of which remains simple while providing better protection against splashes when emptying the contents of the tank into the emptying support.

Another aspect of the present invention may provide an electric cooking appliance, the tank of which has a draining device activated by placing the tank on a draining support, the construction of which remains simple while providing better protection against splashes when emptying the contents of the tank into the emptying support.

According to an embodiment, an electric cooking appliance, in particular an electric fryer, comprises a cooking set, a drain support forming a drain receptacle, and a cover intended to be mounted on the drain support, the electric cooking appliance occupying an emptying configuration in which the emptying support carries the cooking set, the cooking set comprising a tank capable of receiving a cooking bath, the tank being provided with a drainage device comprising a valve capable of occupying a closed stable return position and an open position, a control part bringing the valve into the open position when the electric cooking appliance occupies the drain configuration, since, when the electric cooking appliance occupies the drain configuration, the cover is mounted on the drain support carrying the cooking set, the cover providing a passage for the flow in the drain receptacle of the cooking bath coming from the drain device. These arrangements allow limiting the opening for filling the drain support during the emptying of the cooking bath into the drain receptacle. These provisions thus reduce the risk of splashing out of the enclosure formed by the drain support and the cover.

Then, advantageously, the drain device extends in the passage when the cover is mounted on the drain support and the drain support carries the cooking set. This arrangement allows the cooking bath to flow out of the drain device into the enclosure formed by the drain support and the cover.

As an alternative or additionally, the control part can extend in the passage when the cover is mounted on the drain support and the drain support carries the cooking set.

Advantageously, in addition, the drain support has one or more upper support zone(s) bearing the cooking set, the upper support zone(s) being arranged around the cover mounted on the drain support. Thus, the cooking set can rest on the drain support annularly around the cover, or at several points around the cover. As an alternative or additionally, the cooking set can rest on the cover borne by the drain support. Thus, the drain support can bear the cooking set directly or indirectly.

Then, advantageously, the zone(s) of upper support(s) is/are formed around the drain receptacle. Preferably, the upper support zone(s) surround(s) the drain receptacle.

Then, advantageously, the upper support zone(s) is/are formed on a flange surrounding the drain receptacle. This arrangement stiffens the drain support.

Then, advantageously, the flange has one or more centering walls laterally holding the cooking set resting on the upper support zone(s). This arrangement stabilizes the cooking set disposed on the drain support.

Also, advantageously, the collar is extended by a lower skirt surrounding the drain receptacle. This arrangement protects the side wall of the drain receptacle.

Then, advantageously, the lower skirt has lower notches. This arrangement makes it easier to handle the drain support.

Also, advantageously, one or more lower support zone(s) is/are arranged under the drain receptacle. This arrangement allows to obtain a significant lower bearing surface.

Also, advantageously, the control part comes from the emptying receptacle, preferably from the bottom of the emptying receptacle. This arrangement simplifies the construction of the drain support and of the cover. Alternatively, the control part could in particular belong to the drain support without necessarily coming from the drain receptacle, or even belong to the cover.

Also, advantageously, the cover has a chimney sparing the passage. This arrangement allows to stiffen the cover. This arrangement also allows to better exploit the volume of the drain receptacle.

Then, advantageously, the control part extends inside the chimney when the cover is mounted on the drain support and the drain support bears the cooking set. This arrangement allows better use of the volume of the drain receptacle. This also reduces the risk of splashes.

Also, advantageously, the emptying device extends inside the chimney when the cover is mounted on the emptying support and that the emptying support bears the cooking set. This also reduces the risk of splashes.

Also, advantageously, the electric cooking appliance has a plug provided to close the passage. This arrangement also allows to improve the conservation of the cooking bath in the drain support closed by the cover.

Then, advantageously, the plug is mounted mobile on the cover between a draining position in which the passage is free, and a storage position in which the passage is closed by the plug. This arrangement simplifies the use of the cover.

Then, advantageously, the plug is mounted pivotally on the cover. This arrangement simplifies the construction of the cover.

Advantageously, the plug is supported by the chimney. This arrangement simplifies the construction of the cover.

Also, advantageously, the cover provides a housing receiving the plug in the emptying position when the cover is mounted on the emptying support and the emptying support bears the cooking set. This arrangement reduces the obstruction of the device.

BRIEF DESCRIPTION OF THE DRAWINGS

The invention will be better understood from the study of an exemplary embodiment, taken without any limitation, illustrated in the attached figures, in which.

DETAILED DESCRIPTION OF THE INVENTION

Figure 1:
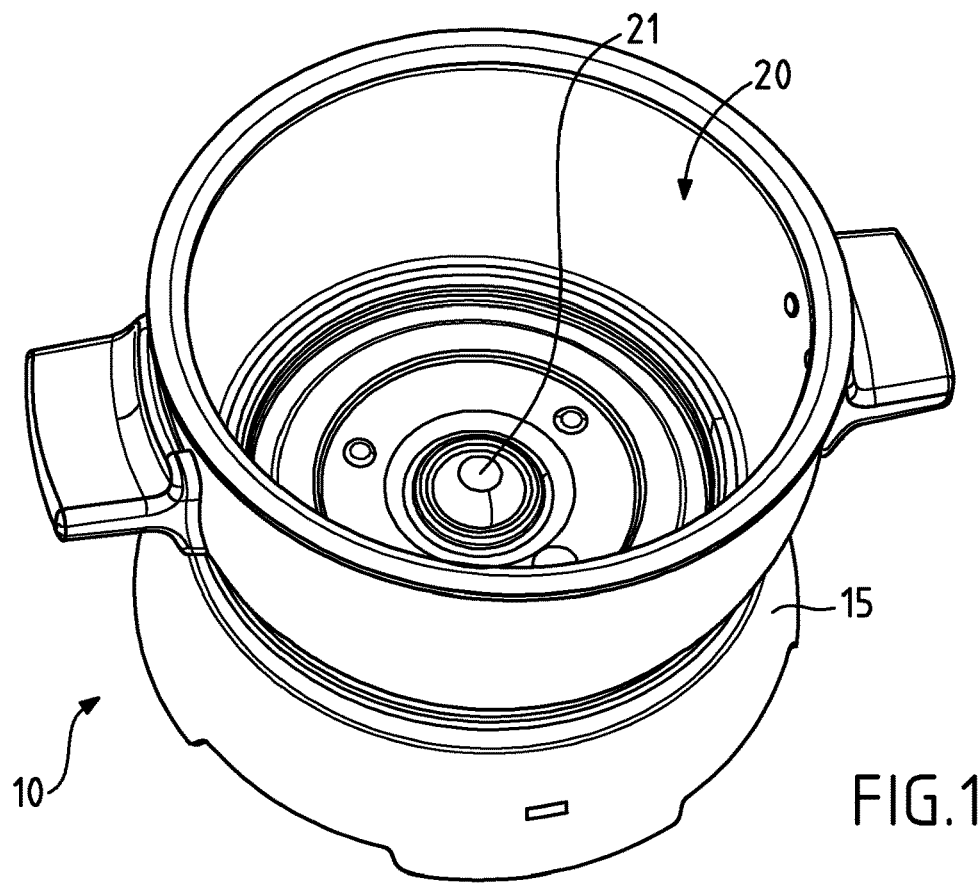
FIG. 1 is a perspective view of a cooking set belonging to an exemplary embodiment of an electric cooking appliance according to the invention.
Figure 2:
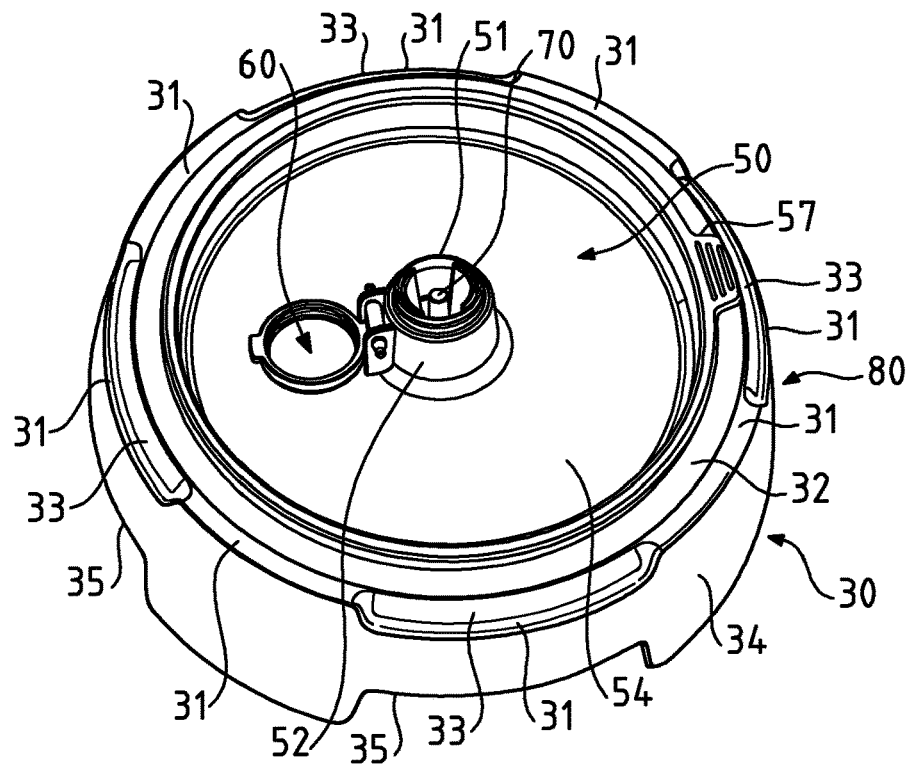
FIG. 2 is a perspective view of a drain support, a cover, and a plug belonging to the electric cooking appliance illustrated in FIG. 1, the plug being in the drain position.

The electric cooking appliance 1 illustrated in FIGS. 1 to 10 is an electric fryer comprising a cooking set 10 represented in FIG. 1 and a drain base 80 represented in FIG. 2.

Figure 10:
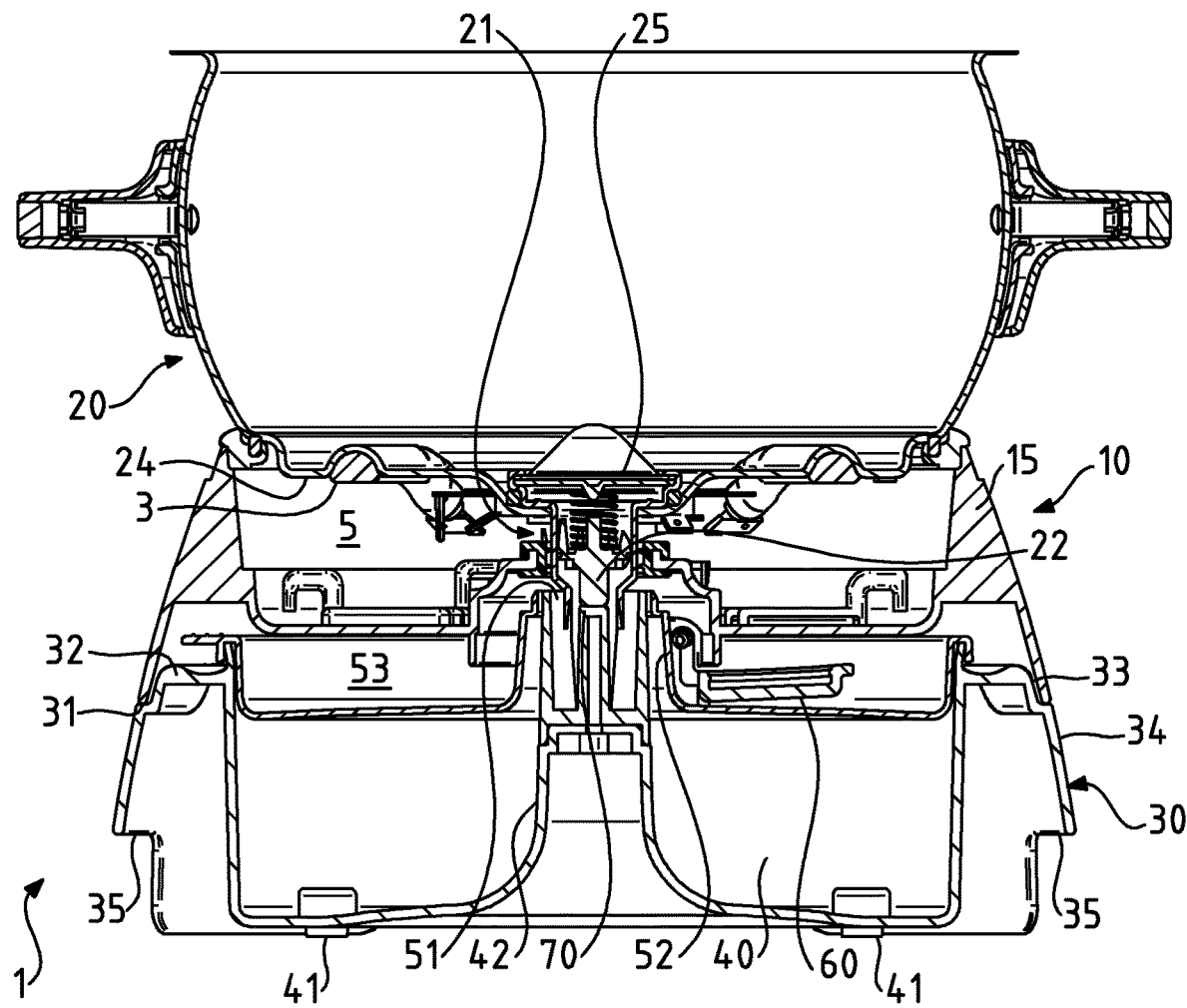
FIG. 10 is a view in elevation and in section of the electric cooking appliance occupying a drain configuration in which the drain support illustrated in FIG. 2 carries the cooking set illustrated in FIG. 1.

As shown in FIGS. 1 and 10, the cooking set 10 comprises a tank 20 adapted to receive a cooking bath. The cooking set 10 comprises a base 15 arranged under a lower part 24 of the tank 20, as best seen in FIG. 10.

Figure 3:
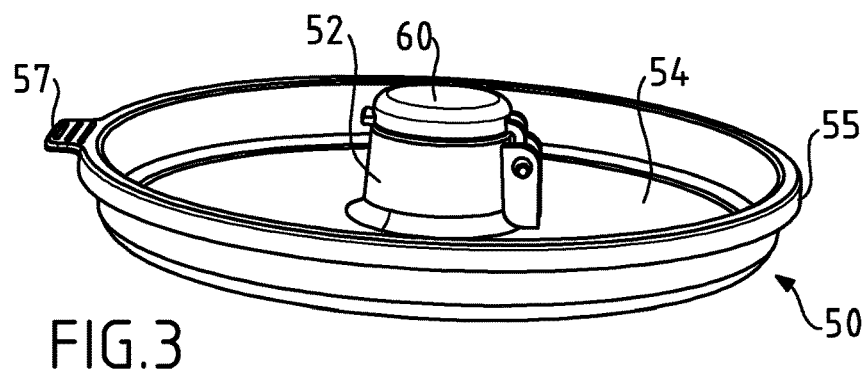
FIG. 3 is a side perspective view of the cover and of the plug illustrated in FIG. 2, the plug being in the conservation position.
Figure 6:
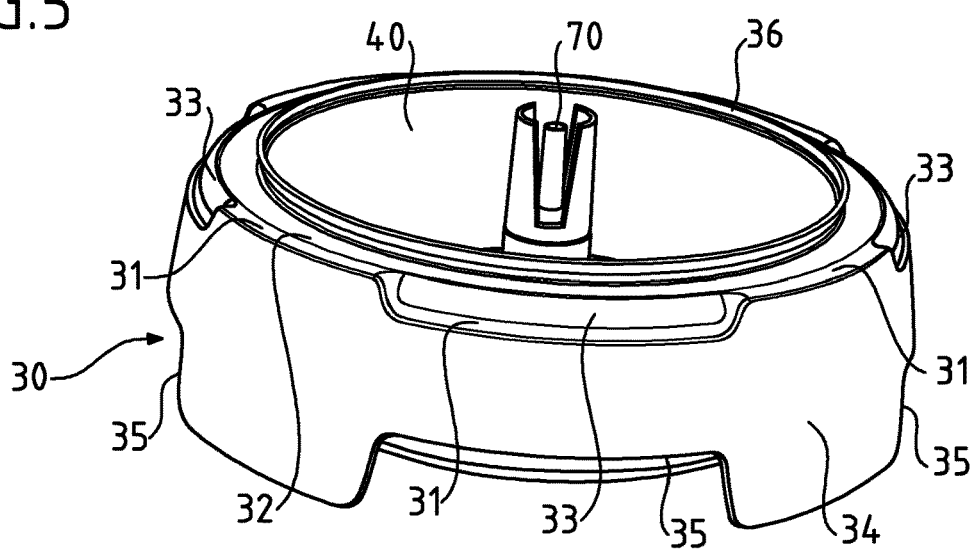
FIG. 6 is a perspective view of the drain support illustrated in FIGS. 2 and 5.
Figure 7:
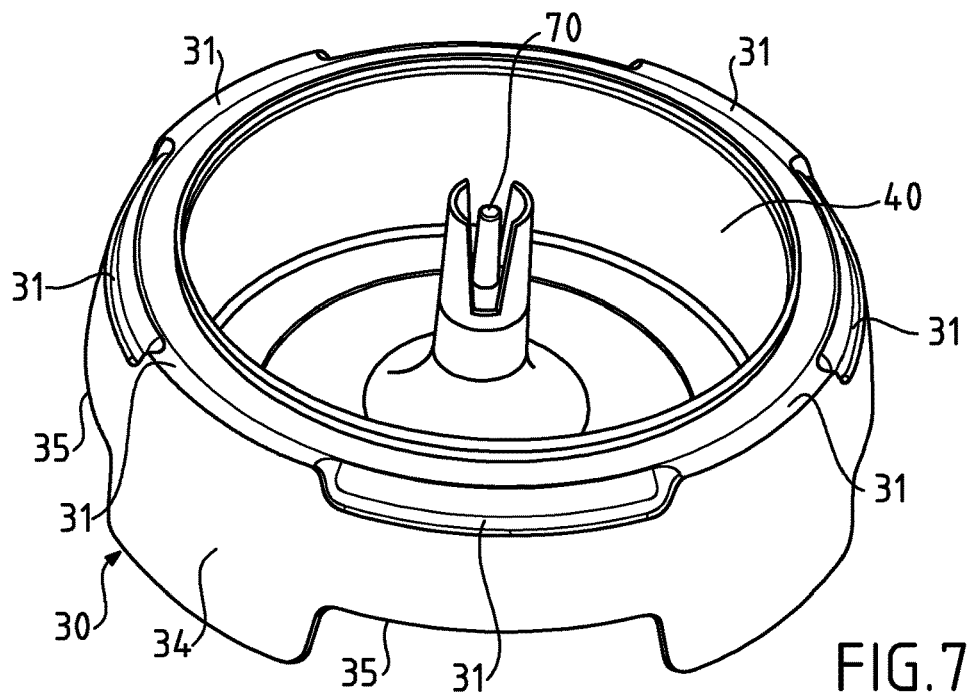
FIG. 7 is a perspective view of the drain support illustrated in FIGS. 2, 5, and 6, in another orientation.
Figure 9:
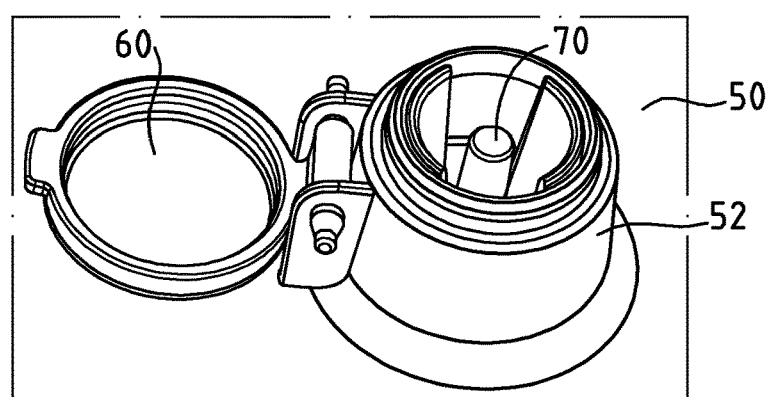
FIG. 9 is a perspective view of part of the cover and of the plug illustrated in FIGS. 2, 3, and 4, the plug being shown in the emptying position.

The drain base 80 comprises a drain support 30, shown in FIGS. 2, 5, 6, and 7, a cover 50, shown in FIGS. 2, 3, 4, and 9, and a plug 60, shown in the FIGS. 2, 3, and 9. The drain support 30 forms a drain receptacle 40, as best seen in FIGS. 6 and 7.

The cover 50 is designed to be mounted on the drain support 30, as shown in FIG. 2.

Figure 4:
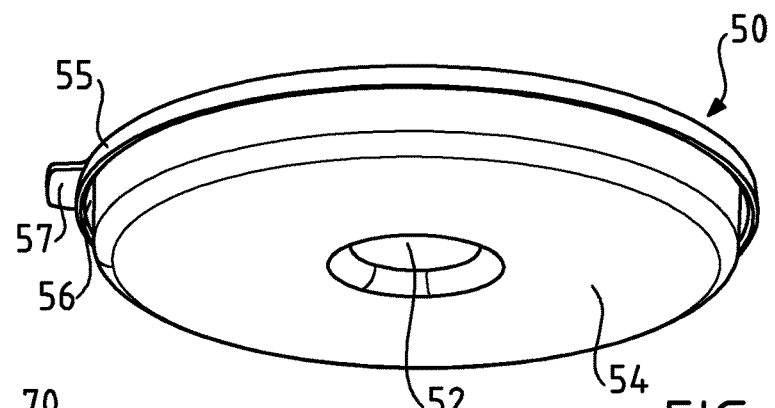
FIG. 4 is a perspective view from below of the cover illustrated in FIGS. 2 and 3.
Figure 5:
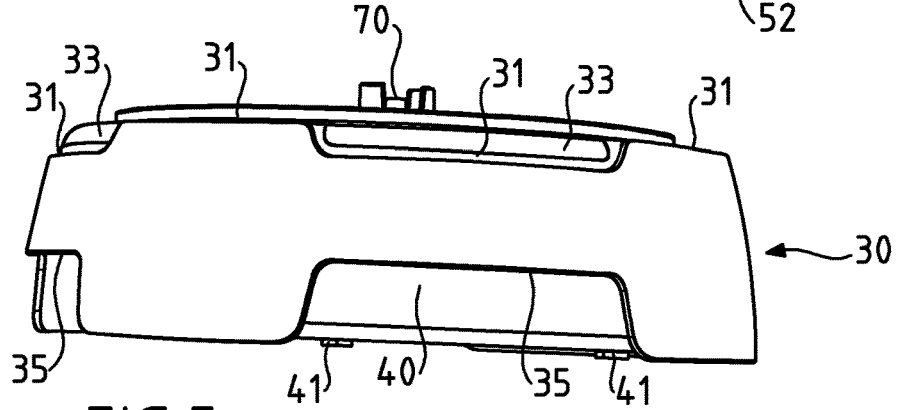
FIG. 5 is an elevation view of the drain support illustrated in FIG. 2.

The cover 50 has a chimney 52 rising above a closure wall 54, as shown in FIG. 3. The closure wall 54 is surrounded by a peripheral border 55 having a lower housing 56, as best seen in FIG. 4. The peripheral edge 55 has an external tongue 57 intended to facilitate the removal of the cover 50 from the drain support 30.

The cover 50 provides a passage 51 for the flow of the cooking bath into the drain support 30 when the drain support 30 bears the cooking set 10. Thus, when the cover 50 is mounted on the drain support 30, the cover 50 closes the drain receptacle 40, with the exception of the passage 51. More particularly, in the embodiment illustrated in the figures, the chimney 52 cleans the passage 51.

The plug 60 is provided to close the passage 51. In the embodiment illustrated in the figures, the plug 60 is mounted mobile on the cover 50 between a drain position, shown in FIGS. 2 and 10, in which the passage 51 is free, and a storage position, shown in FIG. 3, in which the passage 51 is closed by the plug 60. More particularly, in the embodiment illustrated in the figures, the plug 60 is mounted pivotally on the cover 50. The plug 60 is supported by the chimney 52. As it can be seen in FIG. 10, the cover 50 provides a housing 53 receiving the plug 60 in the emptying position when the cover 50 is mounted on the emptying support 30 and that the emptying support 30 bears the cooking set 10.

The drain support 30 has several upper support zones 31 provided for bearing the cooking set 10. As it can be clearly seen in FIG. 2, the upper support zones 31 are arranged around the cover 50 mounted on the drain support 30. The upper support zones 31 are formed around the drain receptacle 40.

More particularly in the embodiment illustrated in the figures, the upper support zones 31 are formed on a flange 32 surrounding the drain receptacle 40. The upper support zones 31 are arranged according to several levels on the flange 32. The flange 32 has several centering walls 33 provided for holding laterally the cooking set 10 resting on the upper support zones 31. Each centering wall 33 is adjacent to one of the upper support zones 31. The flange 32 is extended by a lower skirt 34 surrounding the drain receptacle 40. The lower skirt 34 has lower notches 35. The drain support 30 has a rib 36 extending between the flange 32 and the drain receptacle 40. The rib 36 surrounds the drain receptacle 40. Thus, the rib 36 is annular. The rib 36 forms the upper edge of the drain receptacle 40.

The drain support 30 has lower support zones 41. In the embodiment illustrated in the figures, the lower bearing zones 41 are arranged under the drain receptacle 40. The drain receptacle 40 has, for example, three lower support zones 41 distributed around the periphery of the bottom of the drain receptacle 40.

Figure 8:
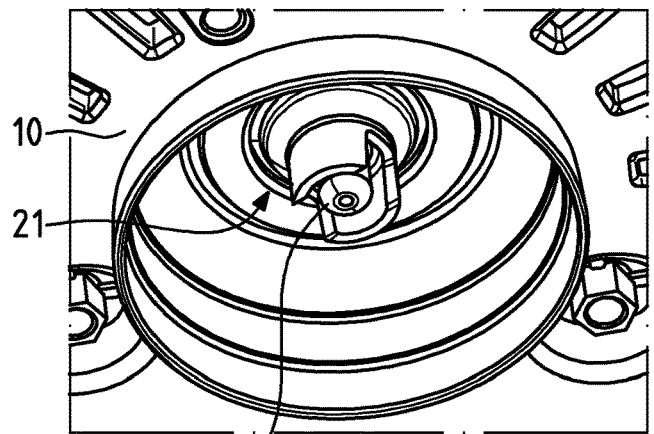
FIG. 8 is a bottom view of a drain device belonging to the cooking set illustrated in FIG. 1.

The tank 20 is provided with a draining device 21, which can be seen in FIGS. 8 and 10. The emptying device 21 comprises a valve 22. The electric cooking appliance 1 comprises a control part 70 designed to activate the valve 22, visible in FIGS. 2, 5, 6, 7, 9, and 10. The valve 22 is capable of occupying a closed stable return position, in the absence of external action, to contain the cooking bath in the tank 20, and an open position, to allow the cooking bath to be emptied, when the valve 22 is pushed back by the control part 70, as shown in FIG. 10. If desired, a thermostatic valve 25 can be arranged upstream of the valve 22, to prevent the draining of the cooking bath if the cooking temperature is too high.

In the embodiment illustrated in the figures, the control part 70 comes from the emptying receptacle 40, more particularly from the bottom of the emptying receptacle 40. As best seen in FIG. 10, the bottom of the drain receptacle 40 has a protuberance 42. The control part 70 is formed by an attached part mounted on the protuberance 42. The control part 70 is arranged in a central position in the emptying receptacle 40.

The electric cooking appliance 1 comprises an electric heating device 3 associated with the tank 20. The tank 20 is assembled with the base 15 to form a chamber 5 housing at least part of the electric heating device 3. In the embodiment illustrated in the figures, the chamber 5 houses the electric heating device 3. As best seen in FIG. 10, the electric heating device 3 is fixed under the lower part 24 of the tank 20. Thus, the electric heating device 3 extends under the lower part 24 of the tank 20. More particularly in the embodiment illustrated in the figures, the electric heating device 3 is produced in the form of an armored heating element. The chamber 5 also houses the electrical connections of the electric heating device 3. The chamber 5 can also house a temperature control device and a thermal safety device. The temperature control device is for example a thermostat. The thermal safety device is, for example, a thermal fuse or a resettable thermal limiter. As a variant, the electric heating device 3 can in particular extend partly inside the tank 20, or even be arranged in the chamber 5, without necessarily being fixed under the internal part 24 of the tank 20.

The electric cooking appliance 1 illustrated in the figures operates and is used in the following manner.

The electric cooking appliance 1 can occupy a drain configuration in which the drain support 30 carries the cooking set 10, as shown in FIG. 10. To achieve this emptying configuration, the user lifts the cooking set 10 and places the cooking set 10 on the emptying support 30.

To benefit from the advantages of the invention, the user has previously placed the cover 50 on the drain support 30. Thus, in the emptying configuration, the cover 50 is mounted on the emptying support 30 bearing the cooking set 10. The lower housing 56 of the cover 50 is then mounted on the rib 36 of the drain support 30. The user can leave the plug 60 in the emptying position on the cover 50, as shown in FIG. 10, to leave the passage 51 free, the passage 51 being used for the flow into the emptying receptacle 40 of the cooking bath from the drain 21.

In the emptying configuration, the cooking set 10 is supported by the emptying support 30. However, the cooking set 10 does not necessarily rest directly on the drain support 30. As a variant, the cooking set 10 can in particular rest on the cover 50 resting on the drain support 30.

In the emptying configuration, the control part 70 brings the valve 22 into the open position. Thus, the positioning of the cooking set 10 on the drain support 30 is sufficient to place the valve 22 in the open position.

The drain receptacle 40 is provided for receiving the cooking bath flowing from the valve 22 when the electric cooking appliance 1 occupies the drain configuration. In the embodiment illustrated in the figures, the drain device 21 extends in the passage 51 when the cover 50 is mounted on the drain support 30 and that the drain support 30 bears the cooking set 10.

More particularly, the emptying device 21 extends inside the chimney 52 when the cover 50 is mounted on the emptying support 30 and that the emptying support 30 bears the cooking set 10, as shown in FIG. 10. The control part 70 extends inside the chimney 52 when the cover 50 is mounted on the drain support 30 and that the drain support 30 bears the cooking set 10.

Thus, the cooking bath flowing from the tank 20 through the emptying device 21 flows into the enclosure formed by the cover 50 and the emptying receptacle 40, which allows to limit splashing.

When the emptying has been done, the user can remove the cooking set 10 from the emptying support 30 and place the plug 60 in the conservation position on the cover 50 to close the passage 51.

As a variant, the control part 70 is not necessarily formed by an insert on the drain support 30, in particular on the drain receptacle 40. The control part 70 could in particular be formed integrally with the drain support 30, in particular with the drain receptacle 40.

As a variant, the control part 70 does not necessarily come from the emptying receptacle 40. The control part 70 could in particular come from the drain support 30, for example between the upper support zone(s) 31 and the drain receptacle 40. The control part 70 could also come from the cover 50. Then, preferably, the drain support 30 bears the cover 50 under the control part 70 or near the control part 70, so that the control part 70 can move the drain valve 22 avoiding that the cover 50 is subjected to significant forces and/or to significant deformations.

As a variant, the drain support 30 could in particular have an upper support zone 31, annular or not, or several upper support zones 31, for bearing the cooking set 10.

As a variant, the drain support 30 could in particular have a centering wall 33, annular or not, or several centering walls 33, for centering the cooking set 10 on the drain support 30.

As a variant, the drain support 30 could in particular have a lower support area 41, annular or not, or several lower support areas 41, for carrying the cooking set 10. The lower support zone(s) 41 is/are not necessarily arranged under the drain receptacle 40, but could, for example, be arranged under the lower skirt 34.

The present invention is in no way limited to the example of embodiment described and to its variants, but encompasses numerous modifications within the scope of the claims.

The invention claimed is:

1. An electric cooking appliance comprising:
a cooking set comprising a tank configured for receiving a cooking bath and a base arranged under a lower part of the tank, the tank provided with a drainage device comprising a valve configured to assume a closed stable return position and an open position;
a control part configured to activate the valve;
a drain support forming a drain receptacle; and
a cover configured to be removably mounted on the drain support and to close the drain receptacle,
wherein the electric cooking appliance is configured to assume a drain configuration in which the drain support directly carries the base and the cover,
wherein the control part is configured to bring the valve to the open position when the electric cooking appliance assumes the drain configuration,
wherein, when the electric cooking appliance assumes the drain configuration, the cover is mounted on the drain support directly bearing the base and the cover, the cover is configured to provide a passage for the flow into the drain receptacle of the cooking bath from the drain device.

2. The electric cooking appliance according to claim 1, wherein the drain device extends in the passage when the cover is mounted on the drain support and that the drain support bears the cooking set.

3. The electric cooking appliance according to claim 1, wherein the drain support has one or more upper support zone(s) bearing the cooking set, and wherein the upper support zone(s) is/are arranged around the cover mounted on the drain support.

4. The electric cooking appliance according to claim 3, wherein the upper support zone(s) is/are formed around the drain receptacle.

5. The electric cooking appliance according to claim 4, wherein the upper support zone(s) is/are formed on a flange surrounding the receptacle drain.

6. The electric cooking appliance according to claim 5, wherein the flange has one or more centering wall(s) holding laterally the cooking set resting on the zone or zones(s) of upper support(s).

7. The electric cooking appliance according to claim 5, wherein the flange is extended by a lower skirt surrounding the drain receptacle.

8. The electric cooking appliance according to claim 7, wherein the lower skirt has lower notches.

9. The electric cooking appliance according to claim 1, wherein one or more lower support zone(s) is/are arranged under the receptacle of drain.

10. The electric cooking appliance according to claim 1, wherein the control part comes from the drain receptacle, from the bottom of the drain receptacle.

11. The electric cooking appliance according to claim 1, wherein the cover has a chimney providing the passage.

12. The electric cooking appliance according to claim 11, wherein the control part extends inside the chimney when the cover is mounted on the drain support and that the drain support bears the cooking set.

13. The electric cooking appliance according to claim 11, wherein the emptying device extends inside the chimney when the cover is mounted on the drain support and that the drain support bears the cooking set.

14. The electric cooking appliance according to claim 1, further comprising a plug provided for closing the passage.

15. The electric cooking appliance according to claim 14, wherein the plug is mounted mobile on the cover between a drainage position in which the passage is free and a storage position in which the passage is closed by the plug.

16. The electric cooking appliance according to claim 15, wherein the plug is mounted pivotally on the cover.

17. The electric cooking appliance according to claim 15, wherein the plug is supported by the chimney.

18. The electric cooking appliance according to claim 15, wherein the cover provides a housing receiving the plug in the emptying position when the cover is mounted on the drain support and wherein the drain support bears the cooking set.

* * * * *